US012658398B2

(12) United States Patent
Xu et al.

(10) Patent No.: US 12,658,398 B2
(45) Date of Patent: Jun. 16, 2026

(54) CATHODE EMISSION DEVICE AND X-RAY TUBE USING SAME

(71) Applicant: WUHAN UNITED IMAGING HEALTHCARE CO., LTD., Wuhan (CN)

(72) Inventors: Xiang Xu, Wuhan (CN); Jiajia Tian, Shanghai (CN); Qi Zhang, Wuhan (CN)

(73) Assignee: WUHAN UNITED IMAGING HEALTHCARE CO., LTD., Wuhan (CN)

( * ) Notice: Subject to any disclaimer, the term of this patent is extended or adjusted under 35 U.S.C. 154(b) by 1002 days.

(21) Appl. No.: 17/804,596

(22) Filed: May 30, 2022

(65) Prior Publication Data

US 2022/0384136 A1 Dec. 1, 2022

(30) Foreign Application Priority Data

May 28, 2021 (CN) ........................ 202110590713.8

(51) Int. Cl.

| | |
|---|---|
| ***H01J 35/06*** | (2006.01) |
| ***H01J 35/02*** | (2006.01) |
| ***H01J 35/04*** | (2006.01) |
| ***H01J 35/14*** | (2006.01) |
| ***H05G 1/58*** | (2006.01) |

(52) U.S. Cl.

CPC ............ *H01J 35/06* (2013.01); *H01J 35/025* (2013.01); *H01J 35/045* (2013.01); *H05G 1/58* (2013.01); *H01J 35/147* (2019.05)

(58) Field of Classification Search

CPC ........ H01J 35/06; H01J 35/025; H01J 35/045; H01J 2235/02; H01J 2235/06; H01J 35/147; H01J 2235/068; H05G 1/70; H05G 1/58

See application file for complete search history.

(56) References Cited

U.S. PATENT DOCUMENTS 4,266,133 A * 5/1981 Weigl ........................ H05G 1/32 378/115
2003/0021380 A1 * 1/2003 Brendler ............... H01J 35/045 378/154

(Continued)

FOREIGN PATENT DOCUMENTS

CN 203445031 U 2/2014
CN 208336145 U 1/2019

(Continued)

OTHER PUBLICATIONS

First Office Action in Chinese Application No. 202110590713.8 mailed on Feb. 25, 2022, 13 pages.

*Primary Examiner* — Chih-Cheng Kao
(74) *Attorney, Agent, or Firm* — METIS IP LLC

(57) ABSTRACT

The present disclosure provides a cathode emission device. The cathode emission device may comprise a cathode assembly, including: a first filament, a second filament, and a grid electrode. The grid electrode may be operably connected to the first filament and surrounding the first filament and the second filament. The cathode assembly may be configured to be operably connected to a high-voltage generator and switchable between a first connection configuration and a second connection configuration.

20 Claims, 9 Drawing Sheets

(56) References Cited

U.S. PATENT DOCUMENTS

| | | | | |
|---|---|---|---|---|
| 2004/0094326 | A1* | 5/2004 | Tang | H01J 35/025 174/137 B |
| 2005/0163281 | A1* | 7/2005 | Negle | H01J 35/02 378/84 |
| 2015/0078511 | A1 | 3/2015 | Tang et al. | |
| 2018/0177478 | A1* | 6/2018 | Shindo | H05G 1/52 |
| 2020/0146135 | A1 | 5/2020 | Tetsuka et al. | |
| 2020/0321183 | A1 | 10/2020 | Xing et al. | |

FOREIGN PATENT DOCUMENTS

| | | | |
|---|---|---|---|
| CN | 111077412 | A | 4/2020 |
| CN | 211505756 | U | 9/2020 |

* cited by examiner

CATHODE EMISSION DEVICE AND X-RAY TUBE USING SAME

CROSS-REFERENCE TO RELATED APPLICATIONS

This application claims priority to Chinese Patent Application No. 202110590713.8, filed on May 28, 2021, the contents of which are hereby incorporated by reference.

TECHNICAL FIELD

The present disclosure generally relates to an X-ray apparatus, and more particularly, to a cathode emission device in an X-ray apparatus.

BACKGROUND

An X-ray apparatus emits an X-ray beam to irradiate a subject (e.g., a patient) for medical imaging and/or treatment. In this process, a count or number of focal spots of the X-ray beam, sizes of the focal spots, and a tube current of an X-ray tube of the X-ray apparatus may be adjusted according to actual needs. However, conventional X-ray apparatuses can hardly implement all the above functions and usually have complicated structures and control circuits. Thus, it is desirable to provide an X-ray apparatus that implements all the above functions and has a relatively simple structure.

SUMMARY

According to one aspect of the present disclosure, a cathode emission device is provided. The cathode emission device may comprise a cathode assembly, including: a first filament; a second filament; and a grid electrode, the grid electrode being operably connected to the first filament and surrounding the first filament and the second filament, wherein the cathode assembly is configured to be operably connected to a high-voltage generator and switchable between a first connection configuration and a second connection configuration.

In some embodiments, the cathode emission device is in a first radiation mode under the first connection configuration.

In some embodiments, two focal spots are formed by the first filament and the second filament, respectively, in the first radiation mode.

In some embodiments, sizes of the two focal spots relate to one or more filament parameters of the first filament and the second filament, respectively.

In some embodiments, the cathode emission device is in a second radiation mode under the second connection configuration.

In some embodiments, a focal spot is formed by the second filament in the second radiation mode.

In some embodiments, a size of the focal spot is determined based on a voltage applied on the grid electrode.

In some embodiments, an emission current of the cathode emission device is determined based on a voltage applied on the grid electrode.

In some embodiments, the cathode emission device may further include one or more third filaments, each of the one or more third filaments being operably connected to the second filament and the high-voltage generator.

In some embodiments, the cathode assembly is configured to be operably connected to the high-voltage generator via a cable assembly.

In some embodiments, one end of the cable assembly is operably connected to the cathode assembly, and the other end of the cable assembly is operably connected to the high-voltage generator.

In some embodiments, the first filament includes a first filament end and a second filament end, the second filament includes a third filament and a fourth filament, and the high voltage generator includes a first high-voltage end, a second high-voltage end, and a public end, connections established via the cable assembly including: the first high-voltage end being operably connected to the second filament end, the second high-voltage end being operably connected to the fourth filament end, and the public end being operably connected to the first filament end and the third filament end under the first connection configuration, and the first high-voltage end being operably connected to the first filament end and the second filament end, the second high-voltage end being operably connected to the fourth filament end, and the public end being operably connected to the third filament end under the second connection configuration.

In some embodiments, the cathode emission device may further include a switch operably connected between the cathode emission device and the high-voltage generator, the switch being configured to form the connections between the cathode assembly and the high-voltage generator under the first connection configuration and the second connection configuration.

According to another aspect of the present disclosure, an X-ray tube is provided. The X-ray tube may comprise a cathode emission device, including: a cathode assembly, including: a first filament; a second filament; and a grid electrode, the grid electrode being operably connected to the first filament and surrounding the first filament and the second filament, wherein the cathode assembly is configured to be operably connected, via a cable, to a high-voltage generator and switchable between a first connection configuration and a second connection configuration.

According to a further aspect of the present disclosure, a cathode emission device is provided. The cathode emission device may comprise a cathode assembly, including: a first filament, including a first filament end and a second filament end; a second filament, including a third filament end and a fourth filament end; and a grid electrode, the grid electrode being operably connected to the first filament end or the second filament end, and surrounding the first filament and the second filament, and a switch is configured to operably connect the cathode assembly and a high-voltage generator, the switch including a first connection end, a second connection end, and a third connection end, the first connection end being operably connected to the first filament end, the second connection end being operably connected to the second filament end, and the third connection end being operably connected to the third filament end, wherein the switch is configured to be switchable between a first switch configuration and a second switch configuration, wherein the first connection end and the third connection end are operably connected under the first switch configuration, and the first connection end and the second connection end are operably connected under the second switch configuration.

In some embodiments, the high-voltage generator includes a first high-voltage end, a second high-voltage end, and a public end.

In some embodiments, the first high-voltage end is operably connected to the second connection end, the second high-voltage end is operably connected to the fourth filament end, and the public end is operably connected to the third connection end.

In some embodiments, the switch includes a single-pole double-throw (SPDT) switch, the first connection end being a moving terminal of the SPDT, and the second connection end and the third connection end being a first fixed terminal and a second fixed terminal of the SPDT, respectively.

In some embodiments, the cathode emission device is in a first radiation mode when the first connection end and the third connection end are operably connected via the switch under the first switch configuration.

In some embodiments, the cathode emission device is in a second radiation mode when the first connection end and the second connection end are operably connected via the switch under the second switch configuration.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
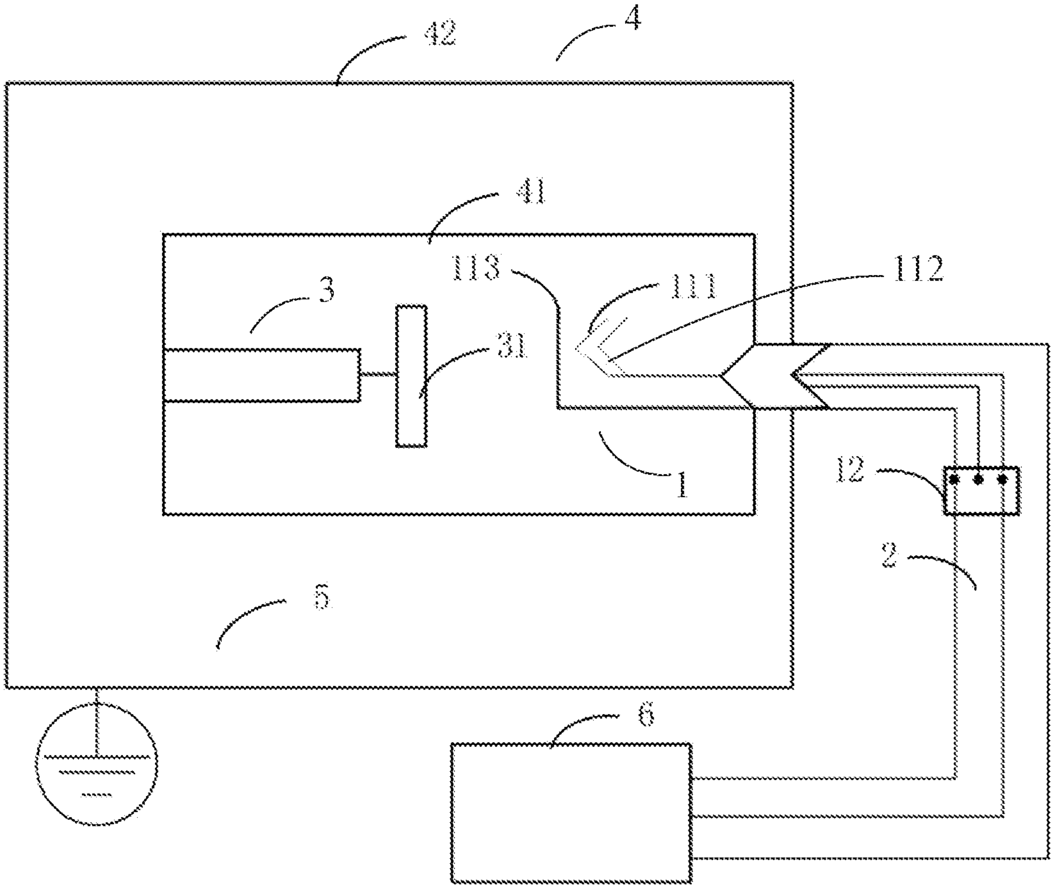
FIGS. 1 and 2 are schematic diagrams illustrating an exemplary X-ray apparatus according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by another expression if they may achieve the same purpose.

It will be understood that when a unit, engine, module or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

Provided herein are systems and methods for non-invasive imaging, such as for disease diagnosis, treatment, and/or research purposes. In some embodiments, the X-ray apparatus may be applied to a single modality system and/or a multi-modality system. The term "modality" used herein broadly refers to an imaging or treatment method or technology that gathers, generates, processes, and/or analyzes imaging information of a subject or treatments the subject. The single modality system may include a Computed Tomography (CT) system, an X-ray system. The multi-modality system may include a Positron Emission Tomography-Computed Tomography (PET-CT) system, a Magnetic Resonance Imaging-Computed Tomography (PET-CT) system, a Positron Emission Tomography-X-ray Imaging (PET-X-ray) system, or the like, or any combination thereof.

According to an aspect of the present disclosure, a cathode emission device may be provided. The cathode emission device may comprise a cathode assembly and a switch. The cathode assembly may include a first filament, a second filament, and a grid electrode. The first filament may include a second filament end and a first filament end. The second filament may include a fourth filament end and a third filament end. The grid electrode may be operably connected to the second filament end or the first filament end. The grid electrode may surround the first filament and/or the second filament. The switch may be configured to operably connect the cathode assembly and a high-voltage generator. The switch may include a first connection end, a second connection end, and a third connection end. The first connection end may be operably connected to the first filament end. The second connection end may be operably connected to the second filament end. The third connection end may be operably connected to the third filament end. The switch may be configured to be switchable between a first switch configuration and a second switch configuration. The first connection end and the third connection end may be operably connected under the first switch configuration. The first connection end and the second connection end may be operably connected under the second switch configuration.

An X-ray tube including the cathode emission device may have a first radiation mode corresponding to the first switch configuration and a second radiation mode corresponding to the second switch configuration. In the first radiation mode, two focal spots may be formed, and the sizes of the two focal spots may relate to one or more filament parameters of the first filament and the second filament, respectively. In the second radiation mode, a focal spot may be formed, and the size of the focal spot may be adjustable. Besides, the tube current of the X-ray tube may be adjustable, or even cut off. In such a case, complex structures of conventional X-ray tubes may be avoided, and the cost for manufacturing the X-ray tube as described in the present disclosure may be reduced. In addition, the switch between the first switch configuration and the second switch configuration may be realized by operably connecting the first connection end 121 to the third connection end or the second connection end, which is more convenient relative to conventional X-ray tubes.

Figure 2:
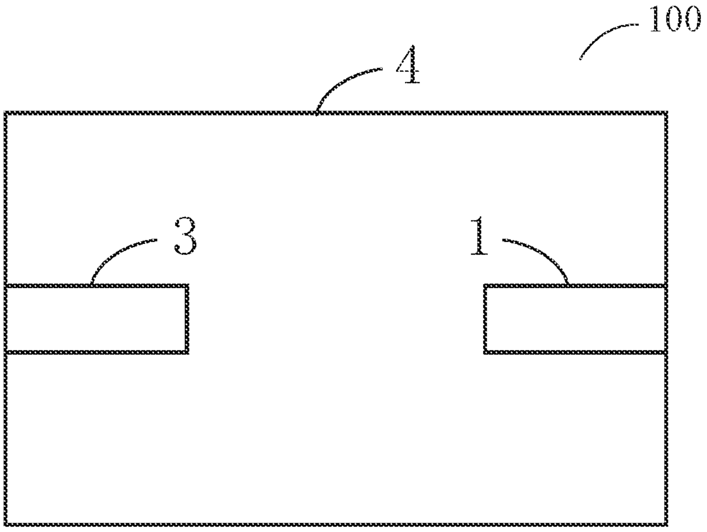

FIGS. 1 and 2 are schematic diagrams illustrating an exemplary X-ray apparatus according to some embodiments of the present disclosure. As illustrated in FIG. 1, the X-ray apparatus may include an X-ray tube 100 and a high-voltage generator 6. The high-voltage generator 6 may include a multiple ends. The X-ray tube 100 may be operably connected to the multiple ends of the high-voltage generator 6 through a cable assembly 2. The cable assembly 2 may include one or more cables (e.g., three cables as illustrated in FIG. 1). The high-voltage generator 6 may generate a high voltage and apply the high-voltage to the X-ray tube 100. The high voltage may be a voltage within a voltage range (e.g., a range from 30 kV to 150 kV). Merely by way of example, the high voltage may be 140 kV.

The X-ray tube 100 may generate an X-ray beam. The X-ray tube 100 may be a cold cathode tube, a high vacuum hot cathode tube, a rotating anode tube, etc. The X-ray tube 100 may be a unipolar X-ray tube or a multipolar X-ray tube. As illustrated in FIG. 2, which includes a schemitic of the X-ray tube 100, the X-ray tube 100 may include a cathode emission device 1, an anode assembly 3, and a housing 4. The high voltage generated by the high-voltage generator 6 may be applied between the cathode emission device 1 and the anode assembly 3 of the X-ray tube 100. The cathode emission device 1 may emit electrons. The anode assembly 3 may receive at least a part of the electrons and produce an X-ray beam. The housing 4 may include a first housing 41 and a second housing 42. The anode assembly 3 and the cathode emission device 1 may be sealed in the first housing 41. The first housing 41 may provide a vacuum environment so that the electron transmission is (substantially) free from interference (e.g., not scattered). As used herein, substantially, when used to describe a feature (e.g., being free from interference), indicates that the deviation from the feature is below a threshold. For instance, that an electron transmission is substantially free from interference may indicate that the scattering occurred during the electron transmission is below a threshold. The first housing 41 may be set in the second housing 42. An insulating coolant 5 may be filled in a space between the first housing 41 and the second housing 42. In these embodiments, the first housing 41 and the second housing 42 may be made of metal, or an alloy thereof.

The cathode emission device 1 may include a cathode assembly 11. The cathode assembly 11 may include at least two filaments and a grid electrode 113. The high-voltage generator 6 may provide the high voltage to one or more of the at least two filaments. Each of the one or more filaments may produce a filament current under the high voltage. The at least two filaments may be made of a metal material with a high melting-point (e.g., tungsten). When a filament current flows through a filament, the filament may be heated to release electrons. The electrons may be emitted to the anode assembly 3 at high speeds under the high voltage between the cathode emission device 1 and the anode assembly 3. The anode assembly 3 may include an anode target 31. After the electrons impinge on the anode target 31 at the high speeds, an energy conversion may occur. A part of kinetic energy of the electrons may be converted into radiant energy. The radiant energy may be released in the form of an X-ray beam. The high voltage electric field between the cathode emission device 1 and the anode assembly 3 may be referred to as a tube voltage. A current formed by high-speed movements of electrons between the cathode emission device 1 and the anode assembly 3 may be referred to as a tube current. A region on a surface of the anode target 31 that absorbs the electrons and produces X-ray may be referred to as a focal point. The grid electrode 113 may modulate the flow of the electrons from the cathode emission device 1 to the anode assembly 3. In some embodiments, the grid electrode 113 may be disposed proximate to the at least two filaments of the cathode emission device 1. The grid electrode 113 may induce or suppress the electron emission from the cathode emission device 1 to the anode assembly 3 when a voltage is applied to the grid electrode 113. Merely for illustration, the at least two filaments may include a first filament 111 and a second filament 112. The grid electrode 113 may surround the first filament 111 and the second filament 112. The grid electrode 113 may modulate a flow of the electrons from the first filament 111 and/or the second filament 112.

In some embodiments, the anode assembly 3 may be grounded. The cable assembly 2 may supply the high voltage to the cathode assembly 11.

The X-ray apparatus may further include a switch 12. The switch 12 may be operably connected between the cathode assembly 11 and the high-voltage generator 6. The switch may control the application of the high voltage to the at least two filaments and/or the grid electrode 113. As illustrated, the switch 12 may be set on the cable assembly 2. In some embodiments, the switch 12 may be set in the X-ray tube 100 or the high-voltage generator 6.

Figure 3:
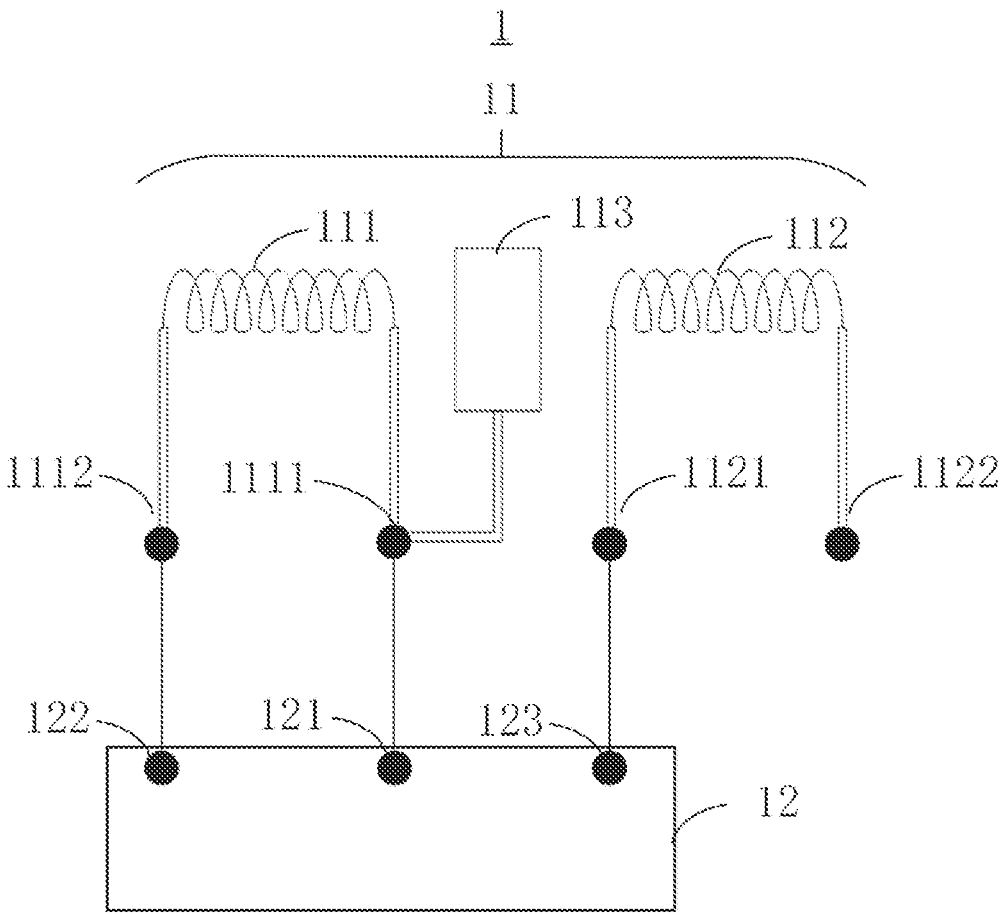
FIG. 3 is a schematic diagram of an exemplary structure of the cathode emission device according to some embodiments of the present disclosure.

FIG. 3 is a schematic diagram of an exemplary structure of the cathode emission device according to some embodiments of the present disclosure.

The cathode emission device 1 may include the cathode assembly 11 and the switch 12. The cathode assembly 11 may include the first filament 111, the second filament 112, and the grid electrode 113. The first filament 111 may include a first filament end 1111 and a second filament end 1112. The second filament 112 may include a third filament end 1121 and a fourth filament end 1122. The first filament end 1111, the second filament end 1112, the third filament end 1121, and the fourth filament end 1122 may be operably connected to the high-voltage generator 6 (not shown in FIG. 3) directly or indirectly (e.g., through the switch 12). The high voltage may be applied to the first filament 111 and/or the second filament 112. The first filament end 1111, the second filament end 1112, the third filament end 1121, and the fourth filament end 1122 are named merely for representing different ends of the first filament and the second filament without specific limitations.

The grid electrode 113 may be operably connected to the first filament end 1111 or the second filament end 1112. As illustrated in FIG. 3, the grid electrode 113 may be operably connected to the first filament end 1111. The operable connection between the grid electrode 113 and the first filament end 1111 or the second filament end 1112 may include an electrical connection. An electric potential on the grid electrode 113 may be the same as an electric potential on the first filament end 1111 or the second filament end 1112. The grid electrode 113 may surround the first filament 111 and the second filament 112 and modulate a flow of electrons from the first filament 111 and/or the second filament 112.

The switch 12 may be configured to operably connect the cathode assembly 11 and the high-voltage generator 6. As illustrated, the switch 12 include a first connection end 121, the second connection end 122, and the third connection end 123. The first connection end 121 may be operably connected to the first filament end 1111, the second connection end 122 may be operably connected to the second filament end 1112, and the third connection end 123 may be operably connected to the third filament end 1121.

The switch 12 may be switchable between a first switch configuration and a second switch configuration. As used herein, the first switch configuration refers to a configuration of the switch 12 under which the first connection end 121 is operably connected to the third connection end 123. As used herein, the second switch configuration refers to a configuration of the switch 12 under which the first connection end 121 is operably connected to the second connection end 122. In some embodiments, the switch 12 may be an electrical control switch. In some embodiments, the switch 12 may be a single-pole double-throw (SPDT) switch. The first connection end 121 may be a moving terminal of the SPDT. The second connection end 122 and the third connection end 123 may be a first fixed terminal and a second fixed terminal of the SPDT, respectively. Detailed descriptions regarding the first switch configuration and the second switch configuration may be found elsewhere in the present disclosure. See, for example, FIGS. 6 and 7, and the descriptions thereof.

Figure 4:
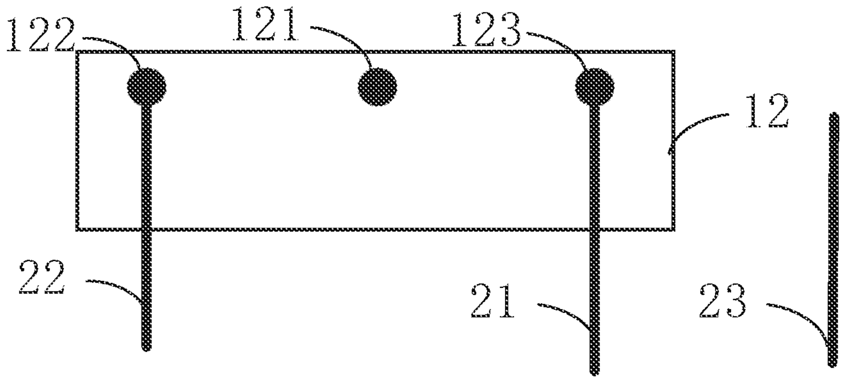
FIG. 4 is a schematic diagram illustrating an exemplary connection between the switch and ends of a high-voltage generator according to some embodiments of the present disclosure.

FIG. 4 is a schematic diagram illustrating an exemplary connection 2 between the switch 12 and ends of the high-voltage generator 6 according to some embodiments of the present disclosure.

The high-voltage generator 6 may include a public end 21, a first high-voltage end 22, and a second high-voltage end 23. The public end 21, the first high-voltage end 22, and the second high-voltage end may be three ends of the high-voltage generator 6. The high voltage generated by the high-voltage generator 6 may be applied to the first filament 111 and the second filament 112 through the cable assembly 2 connected to the three ends. As illustrated in FIG. 4, the public end 21 may be operably (e.g., electrically) connected to the third connection end 123 of the switch 12, the first high-voltage end 22 may be operably (e.g., electrically) connected to the second connection end 122 of the switch 12.

Figure 5:
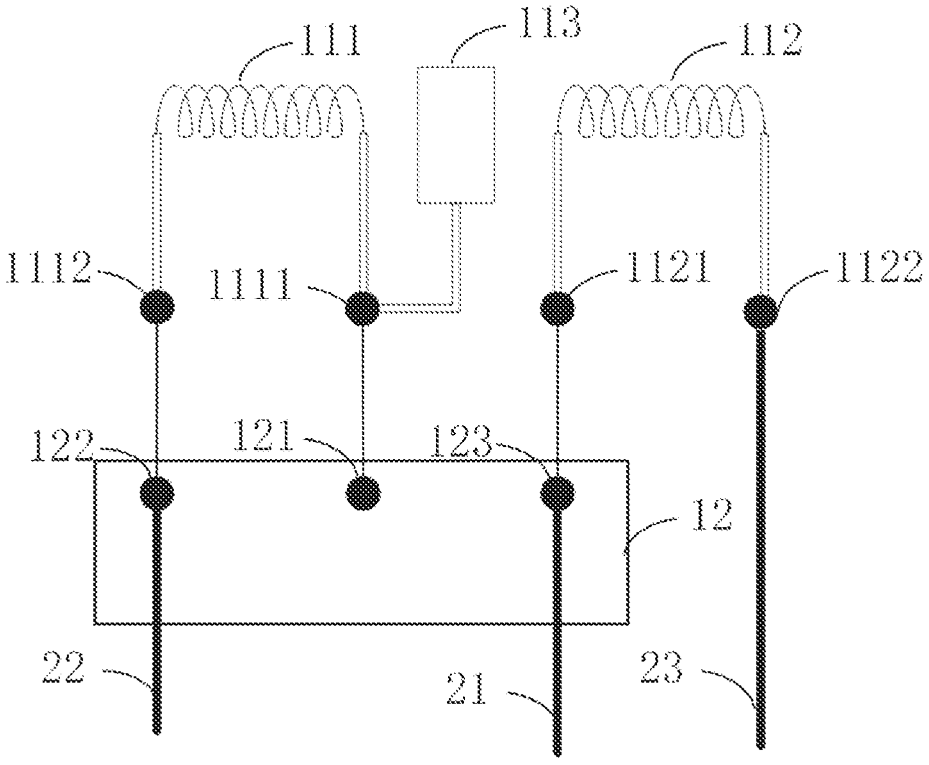
FIG. 5 is a schematic diagram illustrating an exemplary connection between the cathode emission device and ends of a high-voltage generator according to some embodiments of the present disclosure.

FIG. 5 is a schematic diagram illustrating an exemplary connection between the cathode emission device 1 and ends of the high-voltage generator 6 according to some embodiments of the present disclosure.

As set forth above, the cathode emission device 1 may include the cathode assembly 11 and the switch 12. The second filament end 1112 may be operably connected to the first high-voltage end 22 through the second connection end 122 of the switch 12, the third filament end 1121 may be operably connected to the public end 21 through the third connection end 123 of the switch 12, the first filament end 1111 may be operably connected to the first connection end 121 of the switch 12, and the fourth filament end 1122 may be operably connected to the second high-voltage end 23.

Figure 6:
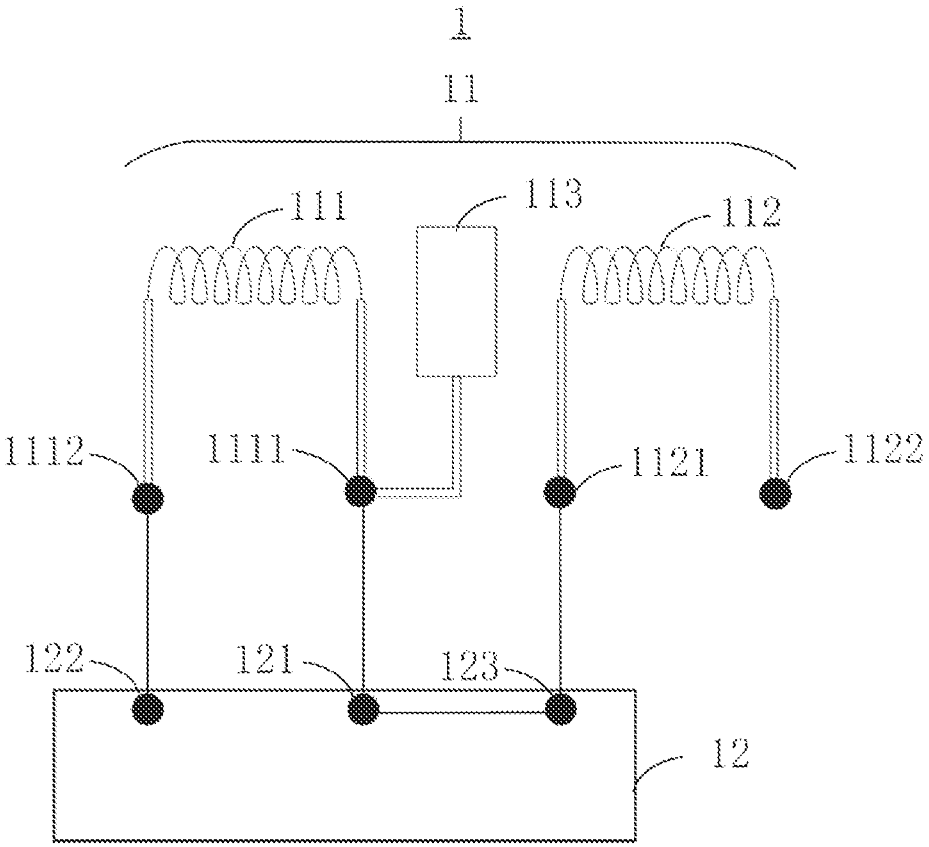
FIG. 6 is a schematic diagram illustrating the first switch configuration according to some embodiments of the present disclosure.

FIG. 6 is a schematic diagram illustrating the first switch configuration according to some embodiments of the present disclosure. As shown in FIG. 6, the first connection end 121 may be operably connected to the third connection end 123. In combination with FIGS. 4 and 5, the first filament end 1111 and the third filament end 1121 may be operably connected to the public end 21, the second filament end 1112 may be operably connected to the first high-voltage end 22, and the fourth filament end 1122 may be operably connected to the second high-voltage end 23. The high voltage generated by the high-voltage generator 6 may be applied to both the first filament 111 and the second filament 112. There is no additional voltage (also referred to as grid voltage) applied on the grid electrode 113.

When the first connection end 121 and the third connection end 123 are operably connected via the switch 12 under the first switch configuration, the X-ray tube 100 including the cathode emission device 1 may be in a first radiation mode. In the first radiation mode, the first filament 111 and the second filament 112 may emit electrons towards the anode assembly 3 (e.g., the anode target 31) due to the high voltage applied to both the first filament 111 and the second filament 112. Two focal spots may be formed by the first filament 111 and the second filament 112, respectively.

In some embodiments, the first filament 111 may be the same as the second filament 112. In some embodiments, the first filament 111 may be different from the second filament 112. For example, one or more filament parameters of the first filament 111 may be different from corresponding filament parameters of the second filament 112. The one or more filament parameters may include at least one of a filament length, a filament width, a filament diameter, a filament material, a count of turns, or a coil pitch, etc. The one or more filament parameters of the first filament 111 (or the second filament 112) may affect a size (e.g., a diameter) of a focal spot formed by the first filament 111 (or the second filament 112). In another word, sizes of the two focal spots formed by the first filament 111 and the second filament 112 may relate to the one or more filament parameters of the first filament and the second filament, respectively. Merely for illustration, a filament length of the second filament may exceed a filament length of the first filament 111, and a size of a focal spot formed by the second filament 112 may be larger than a size of a focal spot formed by the first filament 111.

Figure 7:
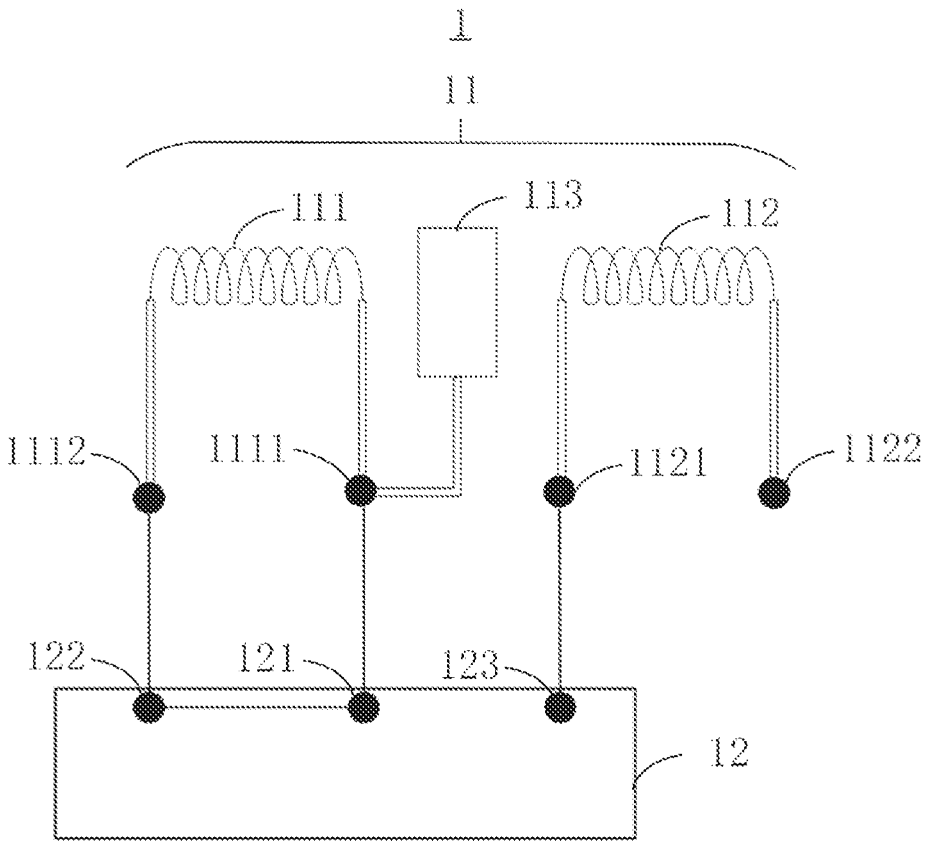
FIG. 7 is a schematic diagram illustrating the second switch configuration according to some embodiments of the present disclosure.

FIG. 7 is a schematic diagram illustrating the second switch configuration according to some embodiments of the present disclosure. As shown in FIG. 7, the first connection end 121 may be operably connected to the second connection end 122. In combination with FIGS. 4 and 5, the first filament end 1111 and the first connection end 121 may be operably connected to the first high-voltage end 22, the third filament end 1121 may be operably connected to the public end 21, and the fourth filament end 1122 may be operably connected to the second high-voltage end 23. The first filament end 1111 and the first connection end 121 may be short-circuited. The high voltage generated by the high-voltage generator 6 may be applied to the second filament 112.

When the first connection end 121 and the second connection end 122 are operably connected via the switch 12 under the second switch configuration, the X-ray tube 100 including the cathode emission device 1 may be in a second radiation mode. In the second radiation mode, the first filament 111 may not emit electrons since the first filament end 1111 and the first connection end 121 are short-circuited, and the second filament 112 may emit electrons towards the anode assembly 3 (e.g., the anode target 31) due to the high voltage applied to the second filament 112. A focal spot may be formed by the second filament 112.

As the switch 12 is under the second switch configuration, a grid voltage may be applied on the grid electrode 113. The grid voltage applied on the grid electrode 113 may enable the grid electrode 113 to modulate a flow of electrons from the second filament 112. A size of the focal spot formed by the second filament 112 may be determined based at least in part on the grid voltage applied on the grid electrode 113. In addition, an emission current (also referred to as tube current) of the X-ray tube 100 may also be determined based at least in part on the grid voltage applied on the grid electrode 113. By adjusting the grid voltage applied on the grid electrode 113, the size of the focal spot formed by the second filament 112 may be changed, the tube current of the X-ray tube 100 may be changed, and/or the tube current of the X-ray tube 100 may be cut off.

Merely by way of example, if the grid voltage applied on the grid electrode 113 is below the voltage applied on the second filament 112, which may result in a change of equipotential lines. A surface area of the second filament 112 that can emit electrons may decrease, and an electrical field may force the electrons emitted from the second filament to focus, thereby reducing the tube current of the X-ray tube 100 and decreasing the size of the focal spot formed by the second filament 112.

Figure 8:
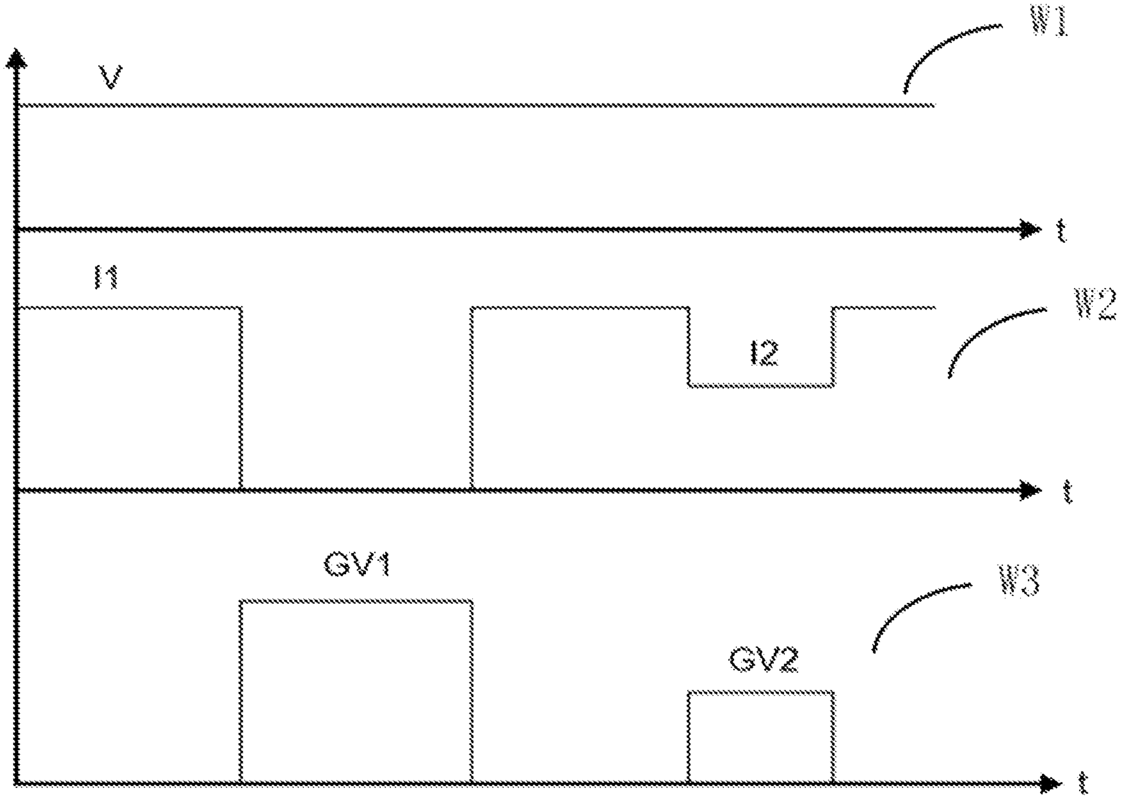
FIG. 8 is a schematic diagram illustrating a tube current of the X-ray tube under the second switch configuration according to some embodiments of the present disclosure.

FIG. 8 is a schematic diagram illustrating a tube current of the X-ray tube 100 under the second switch configuration according to some embodiments of the present disclosure. As illustrated in FIG. 8, a horizontal axis of the graph represents the time t, W1 represents a waveform of the high-voltage applied to the second filament 112 (also referred to as tube voltage of the X-ray tube 100), W2 represents a waveform of the tube current of the X-ray tube 100, and W3 represents a waveform of the grid voltage of the grid electrode 113.

The high-voltage applied to the second filament 112 may be constant. As shown in FIG. 8, when the grid voltage of the grid electrode 113 is 0, the tube current of the X-ray tube 100 may be I1 ($I1>0$); as the grid voltage of the grid electrode 113 is adjusted to GV1 ($GV1>0$), the tube current of the X-ray tube 100 may be cut off; as the grid voltage of the grid electrode 113 is adjusted to 0, the tube current of the X-ray tube 100 may be restored to I1; as the grid voltage of the grid electrode 113 is adjusted to GV2 ($0<GV2<GV1$), the tube current of the X-ray tube 100 may become 12 ($0<12<I1$).

It can be seen that by adjusting the grid voltage of the grid electrode 113, the tube current of the X-ray tube 100 may change between 0 and I1. The adjustment and cut-off of the tube current of the X-ray tube 100 may be realized only by adjusting the grid voltage of the grid electrode 113 under the second switch configuration.

As set forth above, the X-ray tube 100 including the cathode emission device 1 may have the first radiation mode and the second radiation mode. In the first radiation mode, two focal spots may be formed, and the sizes of the two focal spots may relate to one or more filament parameters of the first filament 111 and the second filament 112, respectively. In the second radiation mode, a focal spot may be formed, and the size of the focal spot may be adjustable. Besides, the tube current of the X-ray tube 100 may be adjustable, or even cut off. The first radiation mode and the second radiation mode may be realized by switching between first switch configuration and the second switch configuration. In such a case, complex structures of conventional X-ray tubes may be avoided, and the cost for manufacturing the X-ray tube 100 as described in the present disclosure may be reduced. In addition, the switch between the first switch configuration and the second switch configuration may be realized by operably connecting the first connection end 121 to the third connection end 123 or the second connection end 122, which is more convenient relative to conventional X-ray tubes.

Figure 9:
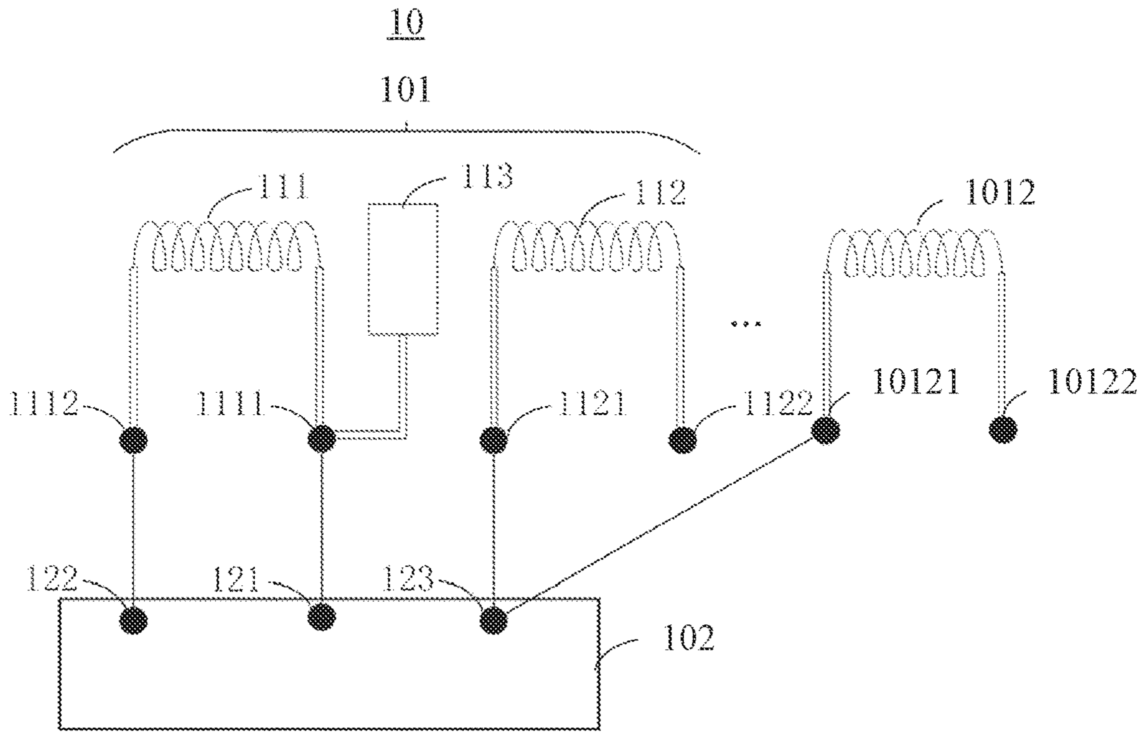
FIG. 9 is a schematic diagram of another exemplary structure of the cathode emission device according to some embodiments of the present disclosure.

FIG. 9 is a schematic diagram of an exemplary structure of the cathode emission device according to some embodiments of the present disclosure.

The cathode emission device 10 may include the cathode assembly 101 and the switch 102. The cathode emission device 10 may be the same as the cathode emission device 1 as illustrated in FIGS. 3-7 except that the cathode assembly 101 of the cathode emission device 10 may further include one or more third filaments 1012. As exemplified in FIG. 9, each of the one or more third filaments 1012 may include a fifth filament end 10121 and a sixth filament end 10122. The fifth filament end 10121 may be operably connected to the third connection end 123. The sixth filament end 10122 may be operably connected to the second high-voltage end 23 of the high-voltage generator 6.

Similar to the cathode emission device 1 as illustrated in FIGS. 3-7, the cathode emission device 10 may also have a first radiation mode and a second radiation mode. In the first radiation mode, at least three focal spots may be formed. Two of the at least three focal spots may be formed by the first filament 111 and the second filament 112 of the cathode emission device 10. Other focal spots except the two focal spots may be formed by the one or more third filaments 1012. Sizes of the other focal spots formed by one or more third filaments 1012 may relate to filament parameters of the one or more third filaments 1012.

In the second radiation mode, the first filament 111 may not emit electrons since the first filament end 1111 and the first connection end 121 are short-circuited, and the second filament 112 and the one or more third filaments 1012 may emit electrons towards the anode assembly 3 (e.g., the anode target 31) due to the high voltage applied to the second filament 112 and the one or more third filaments 1012. At least two focal spots may be formed by the second filament 112 and the one or more third filaments 1012.

A grid voltage applied on the grid electrode 113 may enable the grid electrode 113 to modulate a flow of electrons from the second filament 112 and the one or more third filaments 1012. Sizes of the focal spots formed by the second filament 112 and the one or more third filaments 1012 may be determined based at least in part on the grid voltage applied on the grid electrode 113. In addition, an emission current (also referred to as tube current) of the X-ray tube 100 may also be determined based at least in part on the grid voltage applied on the grid electrode 113. By adjusting the grid voltage applied on the grid electrode 113, sizes of the focal spots formed by the second filament 112 and the one or more third filaments 1012 may be changed, the tube current of the X-ray tube 100 may be changed, and/or the tube current of the X-ray tube 100 may be cut off.

Figure 10:
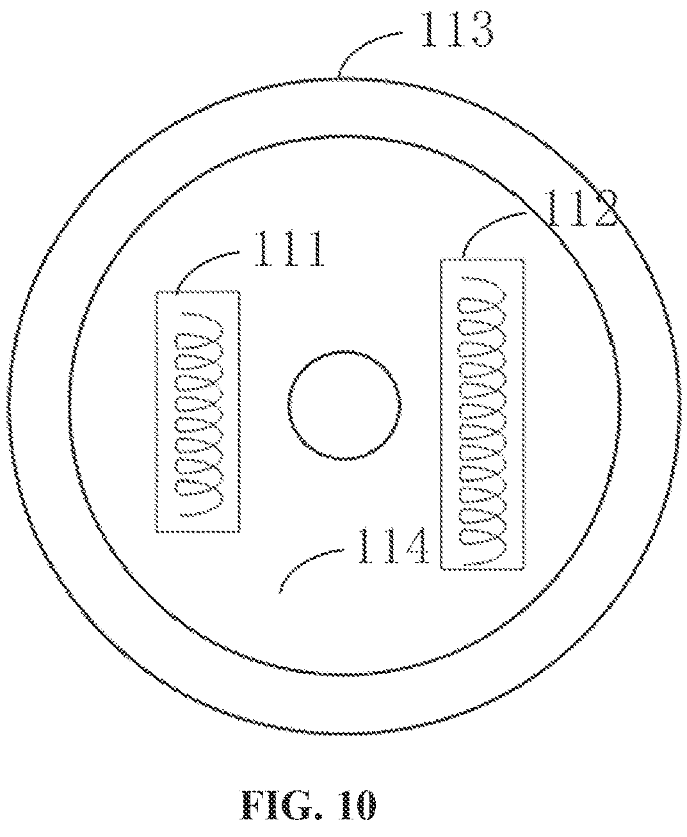
FIG. 10 is a schematic diagram illustrating a structure of a cathode assembly according to some embodiments of the present disclosure.

FIG. 10 is a schematic diagram illustrating a structure of a cathode assembly according to some embodiments of the present disclosure. As illustrated, the cathode assembly 11 may include the first filament 111, the second filament 112, and the grid electrode 113.

The first filament 111 and/or the second filament 112 may be set in an installation slot 114. The grid electrode 113 may have an annular shape. The annular grid electrode 113 may surround the first filament 111 and the second filament 112. The grid electrode 113 may be operably connected to the first filament end 1111 or the second filament end 1112 of the first filament 111 through a mechanical connection. Exemplary mechanical connections may include a welded connection, a screwed connection, a bolted connection, etc.

In some embodiments, the grid electrode 113 may have different shapes. The different shapes may include a square, a rectangle, an oval, etc. In some embodiments, the grid electrode 113 may be constituted by two or more parts. For example, the grid electrode 113 may be formed by two parts. Each of the two parts may have a semi-annular shape. As another example, the grid electrode 113 may be formed by four parts. Each of the four parts may have the shape of a quarter of an annular ring. In some embodiments, a voltage applied to at least one of the two or more parts may be different from voltage(s) applied to the other parts of the two or more parts. In this way, the flow of the electrons emitted by the first filament 111 and/or the second filament 112 may be deflected. In some embodiments, position(s) of focal spot(s) formed by the first filament 111 and/or the second filament 112 on the anode target 31 may be adjusted according to actual needs.

Figure 11:
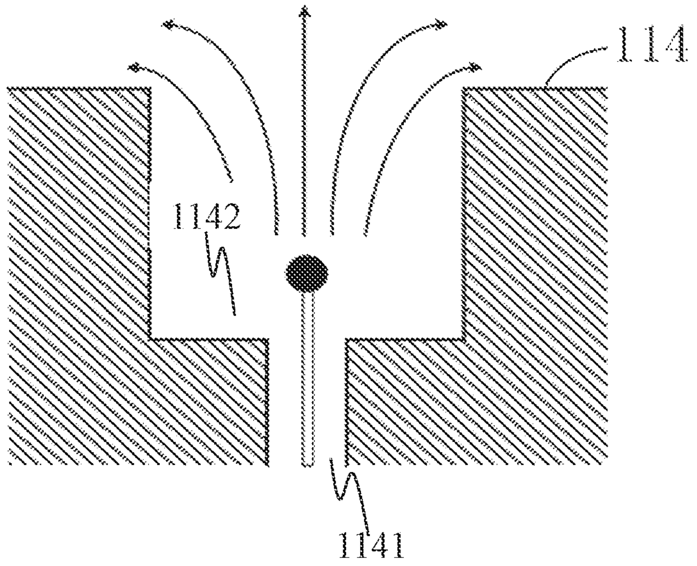
FIG. 11 is a schematic diagram illustrates an installation of a filament in an installation slot according to some embodiments of the present disclosure.

FIG. 11 is a schematic diagram illustrating an installation of a filament in an installation slot according to some embodiments of the present disclosure. As illustrated in FIG. 11, the installation slot may have a groove 1141 formed at a bottom of the installation slot 114. Connection ends of a filament (e.g., the first filament end 1111 and the second filament end 1112 of the first filament 111, the third filament end 1121 and the fourth filament end 1122 of the second filament 112, a fifth filament end 10121 and a sixth filament end 10122 of a third filaments 1012, etc.) may be fixed in the groove 1141. The filament (e.g., the first filament 111, the second filament 112, or a third filaments 1012) may be positioned in an open cavity 1142 of the installation slot 114. When a high voltage is applied on the filament, a flow of electrons may be generated by the filament, and emitted towards the anode assembly 3 from an opening of the installation slot 114.

Figure 12:
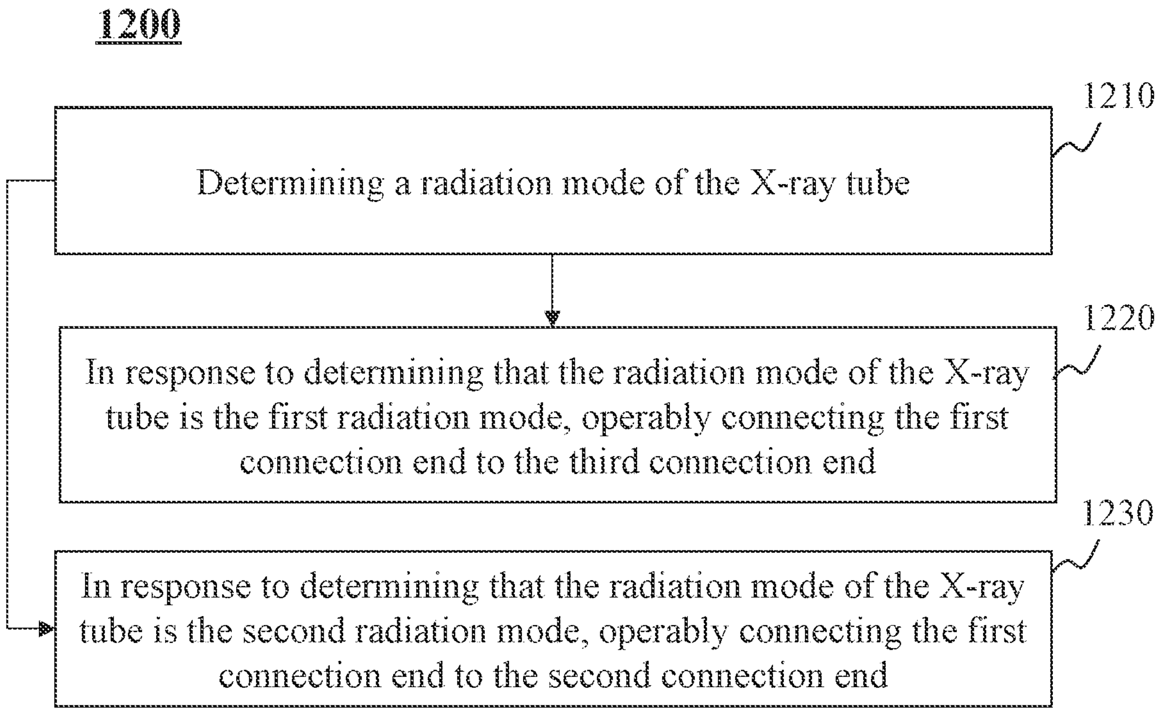
FIG. 12 include a flowchart illustrating an exemplary process for controlling a radiation mode of an X-ray tube according to some embodiments of the present disclosure.

FIG. 12 include a flowchart illustrating an exemplary process for controlling a radiation mode of an X-ray tube 100 according to some embodiments of the present disclosure. The process 1200 for controlling a radiation mode of an X-ray tube 100 may be applicable for the X-ray tube 100 or a portion thereof as illustrated in FIGS. 3-7 and 9.

In 1210, a radiation mode of the X-ray tube 100 may be determined.

The radiation mode of the X-ray tube 100 may include a first radiation mode and a second radiation mode. In the first radiation mode, a count (or number) of focal spots may exceed a count (or number) of focal spots in the second radiation mode. In the second radiation mode, sizes of focal spots and tube current of the X-ray tube 100 may be adjustable.

In 1220, in response to determining that the radiation mode of the X-ray tube 100 is the first radiation mode, the first connection end 121 may be operably connected to the third connection end 123.

In 1230, in response to determining that the radiation mode of the X-ray tube 100 is the second radiation mode, the first connection end 121 may be operably connected to the second connection end 122.

Details regarding the first radiation mode and the second radiation mode may be found elsewhere in the disclosure. See, e.g., FIGS. 6 and 7 and the description thereof, which are not repeated here.

Figure 13A:
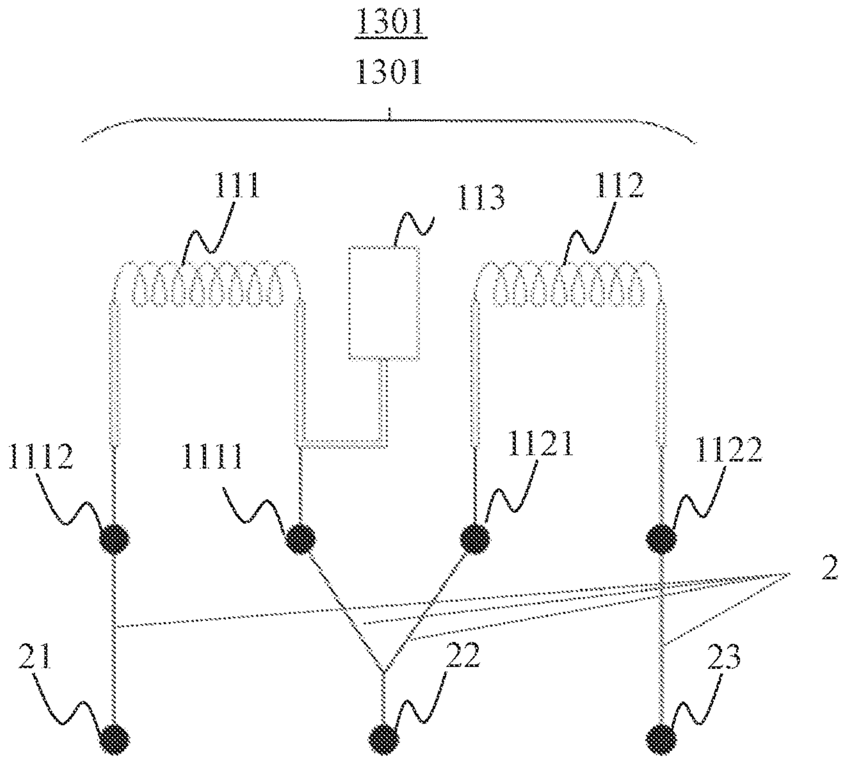
FIGS. 13A and 13B are schematic diagrams illustrating a first connection configuration and a second connection configuration between a cathode assembly and a high-voltage generator, respectively, according to some embodiments of the present disclosure.
Figure 13B:
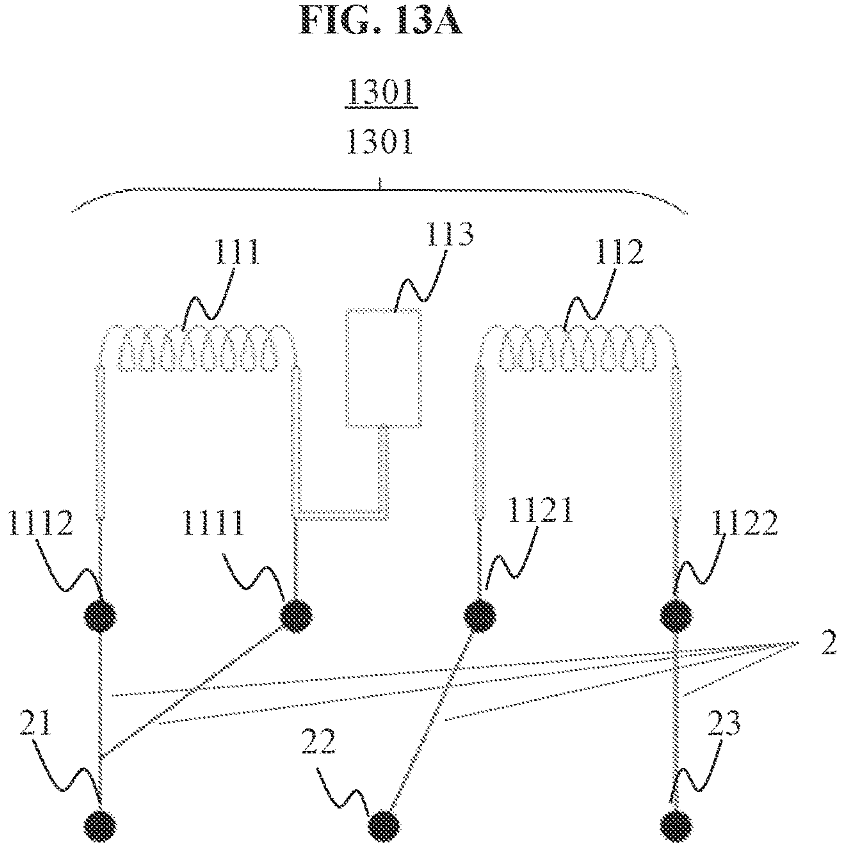

FIGS. 13A and 13B are schematic diagrams illustrating a first connection configuration and a second connection configuration between a cathode assembly and a high-voltage generator, respectively, according to some embodiments of the present disclosure. The cathode emission device 1300 may be similar to the cathode emission device as illustrated in FIGS. 3-11 except that the cathode emission device 1300 may include no switch 12.

The cathode emission device 1300 may include the cathode assembly 1301. The cathode assembly 1301 may include the first filament 111, the second filament 112, and the grid electrode 113. The cathode assembly 1301 may be configured to be operably connected to the high-voltage generator 6 and switchable between a first connection configuration and a second connection configuration. The cathode assembly 1301 may be configured to be operably connected to the high-voltage generator 6 via the cable assembly 2. One end of the cable assembly 2 may be operably connected to the cathode assembly 1301, and the other end of the cable assembly 2 may be operably connected to the high-voltage generator 6 (not shown in FIGS. 13A and 13B).

The first filament 111 may include a first filament end 1111 and a second filament end 1112. The second filament 112 may include a third filament end 1121 and a fourth filament end 1122. The first filament end 1111, the second filament end 1112, the third filament end 1121, and the fourth filament end 1122 may be operably connected to the high-voltage generator 6 via the cable assembly 2. The high voltage generated by the high-voltage generator 6 may be applied to the first filament 111 and/or the second filament 112 via the cable assembly 2. The grid electrode 113 may be operably connected to the first filament end 1111 or the second filament end 1112.

The high voltage generator 6 may include the first high-voltage end 22, the second high-voltage end 23, and the public end 21. A connection between the cathode assembly 1301 and the high-voltage generator 6 may be formed directly by connecting the three ends of the high voltage generator 6 and the ends of the first filament 111 and/or the second filament 112 using the cable assembly 2. The connection between the cathode assembly 1301 and the high-voltage generator 6 may be switchable between a first connection configuration as illustrated in FIG. 13A and a second connection configuration as illustrated in FIG. 13B via the cable assembly 2.

As illustrated in FIG. 13A, via the cable assembly 2, the first high-voltage end 22 may be operably connected to the second filament end 1112, the second high-voltage end 23 may be operably connected to the fourth filament end 1122, and the public end 21 may be operably connected to first filament end 1111 and the third filament end 1121 under the first connection configuration. Under the first connection configuration, the high voltage generated by the high-voltage generator 6 may be applied to both the first filament 111 and the second filament 112. There is no additional voltage (also referred to as grid voltage) applied on the grid electrode 113. The cathode emission device 1300 may be in the first radiation mode. In the first radiation mode, two focal spots may be formed by the first filament 111 and the second filament 112, respectively. Sizes of the two focal spots relate to one or more filament parameters of the first filament 111 and the second filament 112, respectively.

As illustrated in FIG. 13B, via the cable assembly 2, the first high-voltage end 22 may be operably connected to the first filament end 1111 and the second filament end 1112, the second high-voltage end 23 may be operably connected to the fourth filament end 1122, and the public end 21 may be operably connected to the third filament end 1121 under the second connection configuration. Under the second connection configuration, the first filament end 1111 and the first connection end 121 may be short-circuited. The high voltage generated by the high-voltage generator 6 may be applied to the second filament 112. The cathode emission device 1300 may be in the second radiation mode. In the second radiation mode, a focal spot may be formed by the second filament 112. A size of the focal spot may be determined based at least in part on a voltage applied on the grid electrode 113. An emission current of the cathode emission device 1300 may be determined based at least in part on the voltage applied on the grid electrode 113. Details regarding the first radiation mode and the second radiation mode can be found elsewhere in the present disclosure. See, for example, FIGS. 6 and 7 and the descriptions thereof.

In some embodiments, the cathode emission device 1300 may further include one or more third filaments (not shown in FIGS. 13A and 13B). Each of the one or more third filaments including a fifth filament end and a sixth filament end. For each of the one or more third filaments, the fifth filament end may be operably connected to the third filament end 1121, and the sixth filament end may be operably connected to the second high-voltage end 23 of the high-voltage generator 6.

In some embodiments, the cathode emission device 1300 may further include a switch (e.g., the switch 12) that may be operably connected between cathode emission device and the high-voltage generator. The switch may be set on the cable assembly 2. The switch may be configured to form the connections between the cathode assembly and the high-voltage generator under the first connection configuration and the second connection configuration. Details regarding the switch 12 can be found elsewhere in the present disclosure. See, for example, FIGS. 3-7 and 9 and the descriptions thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A cathode emission device, comprising:

a cathode assembly, including:

- a first filament including a first filament end and a second filament end;
- a second filament including a third filament end and a fourth filament end; and
- a grid electrode, the grid electrode being operably connected to the first filament and surrounding the first filament and the second filament, wherein
  - the cathode assembly is configured to be operably connected to a high-voltage generator and switchable between a first connection configuration and a second connection configuration, the high-voltage generator including a first high-voltage end, a second high-voltage end, and a public end, wherein
    - under the first connection configuration, the first high-voltage end is operably connected to the second filament end, the second high-voltage end is operably connected to the fourth filament end, and the public end is operably connected to the first filament end and the third filament end, and
    - under the second connection configuration, the first high-voltage end is operably connected to the first filament end and the second filament end, the second high-voltage end is operably connected to the fourth filament end, and the public end is operably connected to the third filament end.

2. The cathode emission device of claim 1, wherein the cathode emission device is in a first radiation mode under the first connection configuration.

3. The cathode emission device of claim 2, wherein two focal spots are formed by the first filament and the second filament, respectively, in the first radiation mode.

4. The cathode emission device of claim 3, wherein sizes of the two focal spots relate to one or more filament parameters of the first filament and the second filament, respectively.

5. The cathode emission device of claim 1, wherein the cathode emission device is in a second radiation mode under the second connection configuration.

6. The cathode emission device of claim 5, wherein a focal spot is formed by the second filament in the second radiation mode.

7. The cathode emission device of claim 6, wherein a size of the focal spot is determined based on a voltage applied on the grid electrode.

8. The cathode emission device of claim 5, wherein an emission current of the cathode emission device is determined based on a voltage applied on the grid electrode.

9. The cathode emission device of claim 1, further including one or more third filaments, each of the one or more third filaments being operably connected to the second filament and the high-voltage generator.

10. The cathode emission device of claim 1, wherein the cathode assembly is configured to be operably connected to the high-voltage generator via a cable assembly.

11. The cathode emission device of claim 10, wherein one end of the cable assembly is operably connected to the cathode assembly, and the other end of the cable assembly is operably connected to the high-voltage generator.

12. The cathode emission device of claim 1, further including:

- a switch operably connected between the cathode emission device and the high-voltage generator, the switch being configured to form the connections between the cathode assembly and the high-voltage generator under the first connection configuration and the second connection configuration.

13. The cathode emission device of claim 12, wherein

- the switch includes a first connection end, a second connection end, and a third connection end, the first connection end being operably connected to the first filament end, the second connection end being operably connected to the second filament end, and the third connection end being operably connected to the third filament end, wherein
- the switch is configured to be switchable between the first switch configuration and the second switch configuration, wherein the first connection end and the third connection end are operably connected under the first switch configuration, and the first connection end and the second connection end are operably connected under the second switch configuration.

14. The cathode emission device of claim 13, wherein the switch includes a single-pole double-throw (SPDT) switch, the first connection end being a moving terminal of the SPDT, and the second connection end and the third connection end being a first fixed terminal and a second fixed terminal of the SPDT, respectively.

15. The cathode emission device of claim 13, wherein the cathode emission device is in a first radiation mode when the first connection end and the third connection end are operably connected via the switch under the first switch configuration.

16. The cathode emission device of claim 13, wherein the cathode emission device is in a second radiation mode when the first connection end and the second connection end are operably connected via the switch under the second switch configuration.

17. An X-ray tube, comprising:

a cathode emission device, including:

a cathode assembly, including:

a first filament including a first filament end and a second filament end;

a second filament including a third filament end and a fourth filament end; and a grid electrode, the grid electrode being operably connected to the first filament and surrounding the first filament and the second filament, wherein the cathode assembly is configured to be operably connected to a high-voltage generator and switchable between a first connection configuration and a second connection configuration, the high-voltage generator including a first high-voltage end, a second high-voltage end, and a public end, wherein under the first connection configuration, the first high-voltage end is operably connected to the second filament end, the second high-voltage end is operably connected to the fourth filament end, and the public end is operably connected to the first filament end and the third filament end, and under the second connection configuration, the first high-voltage end is operably connected to the first filament end and the second filament end, the second high-voltage end is operably connected to the fourth filament end, and the public end is operably connected to the third filament end.

18. The X-ray tube of claim 17, wherein the cathode emission device is in a first radiation mode under the first connection configuration.

19. The X-ray tube of claim 18, wherein two focal spots are formed by the first filament and the second filament, respectively, in the first radiation mode.

20. A cathode emission device, comprising:

a cathode assembly, including:

a first filament, including a first filament end and a second filament end;

a second filament, including a third filament end and a fourth filament end; and a grid electrode, the grid electrode being operably connected to the first filament end or the second filament end, and surrounding the first filament and the second filament, and a switch configured to operably connect the cathode assembly and a high-voltage generator, the switch including a first connection end, a second connection end, and a third connection end, the first connection end being operably connected to the first filament end, the second connection end being operably connected to the second filament end, and the third connection end being operably connected to the third filament end, wherein the switch is configured to be switchable between a first switch configuration and a second switch configuration, wherein the first connection end and the third connection end are operably connected under the first switch configuration, and the first connection end and the second connection end are operably connected under the second switch configuration;

the high-voltage generator includes a first high-voltage end, a second high-voltage end, and a public end, wherein under the first connection configuration, the first high-voltage end is operably connected to the second filament end, the second high-voltage end is operably connected to the fourth filament end, and the public end is operably connected to the first filament end and the third filament end, and under the second connection configuration, the first high-voltage end is operably connected to the first filament end and the second filament end, the second high-voltage end is operably connected to the fourth filament end, and the public end is operably connected to the third filament end.

* * * * *